US010031832B1

(12) United States Patent
Bastien et al.

(10) Patent No.: US 10,031,832 B1
(45) Date of Patent: *Jul. 24, 2018

(54) DYNAMIC SANDBOXING (71) Applicant: Google LLC, Mountain View, CA (US)

(72) Inventors: Jean-Francois Bastien, Mountain View, CA (US); David C. Sehr, Cupertino, CA (US)

(73) Assignee: Google LLC, Mountain View, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/883,917

(22) Filed: Oct. 15, 2015

Related U.S. Application Data (63) Continuation of application No. 14/144,777, filed on Dec. 31, 2013, now Pat. No. 9,189,375.

(51) Int. Cl.
*G06F 11/00* (2006.01)
*G06F 11/36* (2006.01)
*H04L 29/08* (2006.01)

(52) U.S. Cl.
CPC ........ *G06F 11/3612* (2013.01); *H04L 67/303* (2013.01)

(58) Field of Classification Search
USPC ........................................................ 714/38.1
See application file for complete search history.

(56) References Cited

U.S. PATENT DOCUMENTS 7,574,709 B2 * 8/2009 Erlingsson ............ G06F 9/4411 713/2
9,684,785 B2 * 6/2017 Walsh ..................... G06F 21/53
2012/0166869 A1 * 6/2012 Young ................... G06F 11/008 714/15

(Continued)

OTHER PUBLICATIONS

Ansel, J., et al., "Language-Independent Sandboxing of Just-In-Time Compilation and Self-Modifying Code", PLDI 2011, San Jose, CA, USA, Jun. 4-8, 2011, 12 pages.

(Continued)

*Primary Examiner* — Sarai E Butler
(74) *Attorney, Agent, or Firm* — Lerner, David, Littenberg, Krumholz & Mentlik, LLP (57) ABSTRACT

Methods, systems, and apparatus, including computer programs encoded on a computer storage medium, for dynamic sandboxing. In one aspect, a method includes obtaining software including program instructions for execution by a data processing apparatus; identifying, from a plurality of predefined software characteristics, software characteristics of the software, each identified software characteristic corresponding to a set of the program instructions included in the software; accessing sandbox data defining, for each of the predefined software characteristics, one or more sandbox methods that are eligible for use when executing program instructions that correspond to the predefined software characteristics; selecting, from a plurality of sandbox methods, one or more sandbox methods based on the identified software characteristics and their respectively corresponding sandbox methods, each of the plurality of sandbox methods comprising sandbox instructions for executing program instructions using fault isolation techniques; and causing execution of the software using the selected sandbox methods.

21 Claims, 4 Drawing Sheets

(56) References Cited

U.S. PATENT DOCUMENTS

2014/0068336 A1* 3/2014 Naveh ................ G06F 11/3684
714/32
2015/0195376 A1 7/2015 Sehr et al.

OTHER PUBLICATIONS

Chernoff, A., et al., "FX!32: A Profile-Directed Binary Translator", IEEE Micro, Mar./Apr. 1998, vol. 18, No. 2, pp. 56-64.

"Rosetta". apple.wikia.com [online] [retrieved on Jan. 28, 2013]. Retrieved from the Internet: URL: http://apple.wikia.com/wiki/Rosetta, 1 page.

Schneider, F., "CS 513 System Security—Software-based Fault Isolation". cs.cornell.edu [online]. 2012 [retrieved on Aug. 30, 2012]. Retrieved from the Internet: URL: http://www.cs.cornell.edu/courses/cs513/2005fa/L13.html, 5 pages.

"Technical Overview—Native Client—Google Developers". developers.google.com [online]. 2012 [retrieved on Aug. 30, 2012]. Retrieved from the Internet: URL: https://developers.google.com/native-client/overview, 7 pages.

Yee, B., et al., "Native Client: A Sandbox for Portable, Untrusted x86 Native Code", Proceeding of the 2009 30th IEEE Symposium on Security and Privacy conference, Oakland, CA, USA, May 17-20, 2009, 15 pages.

\* cited by examiner

DYNAMIC SANDBOXING

This application is a continuation of application Ser. No. 14/144,777, filed Dec. 31, 2013, and entitled "DYNAMIC SANDBOXING," the disclosure of which is incorporated herein by reference in its entirety.

BACKGROUND

This specification relates to dynamic sandboxing.

Software sandboxing is a method for executing code in a controlled environment, such as a virtual machine or in a manner that restricts access to certain resources. Sandboxing may be used for computer security purposes, e.g., to run untrusted or unknown applications with restrictions that allow the code to be verified before the code is executed on a data processing apparatus without sandboxing restrictions. Sandboxing software takes time and involves a certain amount of overhead, in terms of system resources. Different sandbox methods have different restrictions, and the different sandbox methods often have different requirements for being used and, depending on which sandbox method is chosen, the observable overhead introduced also vary.

SUMMARY

This specification describes technologies relating to dynamic software sandboxing based on software characteristics.

In general, one innovative aspect of the subject matter described in this specification can be embodied in methods that include the actions of obtaining software including program instructions for execution by a data processing apparatus; identifying, from a plurality of predefined software characteristics, software characteristics of the software, each identified software characteristic corresponding to a set of the program instructions included in the software; accessing sandbox data defining, for each of the predefined software characteristics, one or more sandbox methods that are eligible for use when executing program instructions that correspond to the predefined software characteristics; selecting, from a plurality of sandbox methods defined by the sandbox data, one or more sandbox methods based on the identified software characteristics and their respectively corresponding sandbox methods, each of the plurality of sandbox methods comprising sandbox instructions for executing program instructions using fault isolation techniques; and causing execution of the software using the selected sandbox methods. Other embodiments of this aspect include corresponding systems, apparatus, and computer programs.

These and other embodiments can each optionally include one or more of the following features. A method may further comprise selecting, based on the identified software characteristics, two or more zones for the software, and selecting one or more sandbox methods may comprise selecting one or more separate sandbox methods for each zone.

A method may further comprise determining one or more zone transfer rules for transferring control flow from one zone of the software to another zone during execution of the software, and causing execution of the software may comprise causing execution of the software using the determined zone transfer rules.

Identifying, from a plurality of predefined software characteristics, software characteristics of the software may comprise: providing the software to a translator that translates the software and heuristically determines software characteristics of the software during translation; and identifying the heuristically determined software characteristics as the characteristics of the software.

Identifying, from a plurality of predefined software characteristics, software characteristics of the software may comprise: causing execution of the software; and heuristically determining software characteristics of the software during execution.

A method may further comprise identifying, from a plurality of predefined hardware profiles, a hardware profile of the data processing apparatus, each identified hardware profile corresponding to a set of hardware specific sandbox methods, and the plurality of sandbox methods may consist of the set of hardware specific sandbox methods that correspond to the identified hardware profile.

The identified hardware profile may specify two or more different types of data processors for the data processing apparatus; each different type of data processor may have a different set of hardware specific sandbox methods; and the plurality of sandbox methods from which sandbox methods are selected may depend upon which type of data processor is to be used for execution of the program instructions that correspond to the identified software characteristics that form a basis for selecting sandbox methods.

Particular embodiments of the subject matter described in this specification can be implemented so as to realize one or more of the following advantages. Using dynamic sandboxing allows for customized sandboxing methods based on the software characteristics of the code being executed. Using sandbox methods that have been heuristically determined to be good candidates for the particular software characteristics being sandboxed may result in less overhead than using a sandbox method that does not take software characteristics into account. Dynamic sandboxing may also result in more secure sandboxing by using sandboxing methods that, when used with particular software and/or hardware characteristics, may be more secure than other sandboxing methods. In addition, a sandbox implementer making use of dynamic sandboxing may be compatible with a broad range of hardware and software combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A sandbox implementer facilitates dynamic software sandboxing, e.g., causing execution of software using fault isolation techniques that are chosen based on characteristics of the software. For example, an untrusted program can be analyzed to heuristically determine characteristics of the program and to select one or more sandbox methods based on the characteristics.

A sandbox implementer obtains software that includes program instructions that can be translated and executed by a data processing apparatus. Characteristics of the software are identified to facilitate the selection of sandbox methods to be used during execution of the software. Software characteristics may specify various features that apply to sets of program instructions. For example, one software characteristic may apply to instructions that are executed often, such as instructions included in loops, while another software characteristic may apply to instructions that communicate often using memory. Software characteristics may be determined by user provided information, such as hints or code comments, and/or heuristically, during compilation or at runtime, by analyzing the instructions or monitoring the behavior of software.

Based on the characteristics of the software, the sandbox implementer can select one or more sandbox methods to be used for executing the instructions. For some programs, one sandbox method may be chosen for the entire program, while for other programs multiple sandbox methods may be chosen. For example, if a characteristic of a program indicates that one function of the program has high register pressure, the sandbox implementer may choose, for that function, a sandbox method that reserves a relatively small number of registers; if another characteristic of the program indicates that software traces are communicating often, the sandbox implementer may choose a sandbox method that uses shared memory for trace communications.

In some implementations, a hardware profile may also be used to determine which sandbox methods to select. For example, for a particular hardware profile, certain sandbox methods may behave differently, or not work at all, depending on the processor architecture and operating system of the data processing apparatus used to execute the software.

In some implementations, software may be separated into zones based on identified characteristics, and a separate sandbox method can be used in each zone. The sandbox implementer can use zone transfer rules to ensure control flow integrity, e.g., by ensuring that control flow during execution is constrained to control flow targets that were identified and checked for safety before execution, and data integrity, e.g., no loads or stores outside of a data sandbox, when the program transfers control between zones that use separate sandbox methods.

Figure 1:
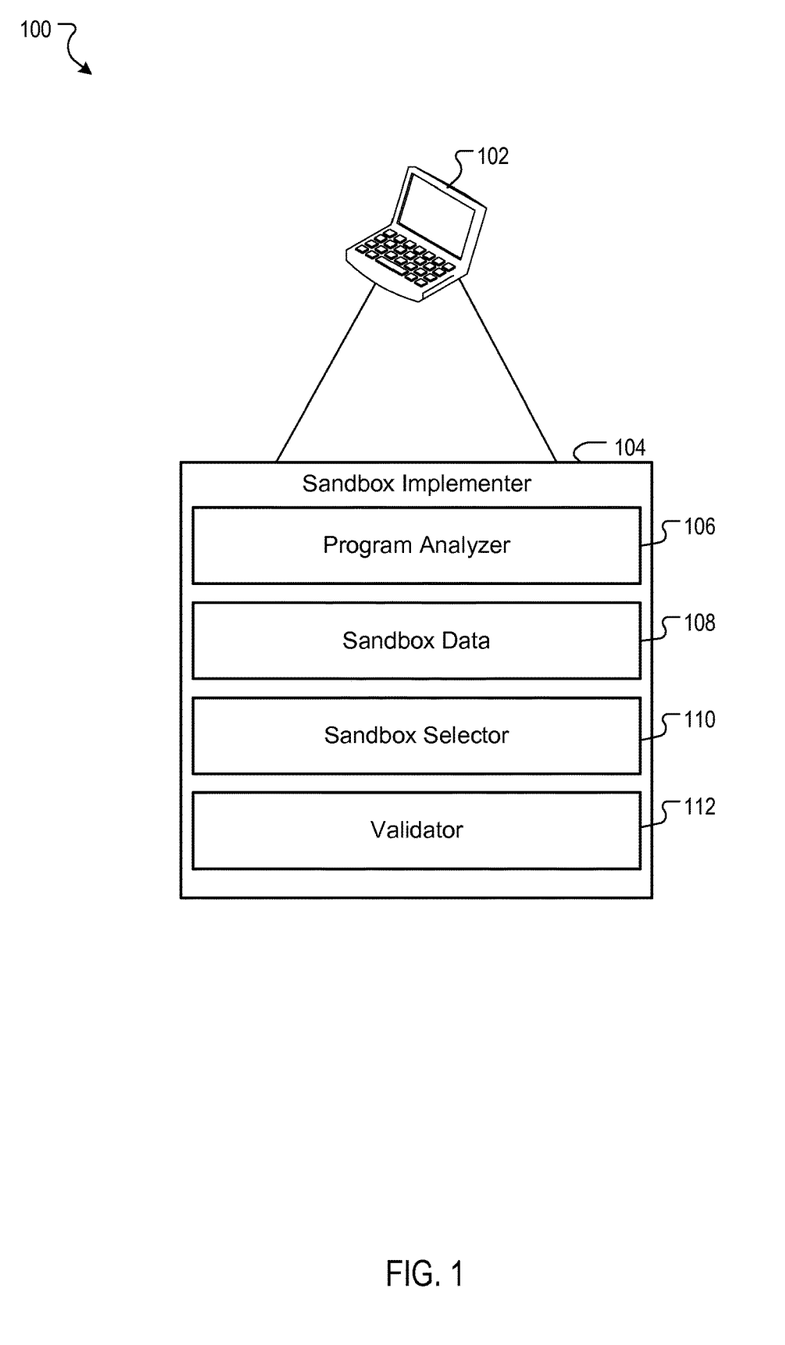
FIG. 1 is a block diagram of an example environment in which software is dynamically sandboxed.

FIG. 1 is a block diagram of an example environment 100 in which software is dynamically sandboxed. The example environment 100 includes a computer device 102, which is an electronic device capable of performing dynamic sandboxing. Example computer devices include personal computers, server computers, mobile communication devices, and instantiations of the same in virtual machine environments. A computer device 102 includes a sandbox implementer 104 for executing software using one or more sandboxing methods. The sandbox implementer 104 may include various components to facilitate sandboxing, such as a program analyzer 106, sandbox data 108, a sandbox selector 110, and a validator 112. The sandbox implementer 104 may be a stand-alone component or program included in the computer device 102, or it may be part of other another component or program included in the computer device 102, e.g., built into the computer device's operating system software, part of a server computer's security software, or part of a computer device's web browser.

By way of example, the sandbox implementer 104 may be included in a web browser installed on a personal computer. The web browser may be used to render web pages received by the personal computer. A web page, for example, may include Hypertext Markup Language (HTML) code which may be parsed by a web browser to render the web page. A web page may also include, or include references to, one or more web applications or programs, such as a script, media player, or game. The web browser may use the sandbox implementer 104 to sandbox an untrusted web application included in a web page, which may help safely determine whether the web application includes a computer virus or other malicious code.

The program analyzer 106 component of the sandbox implementer 104 analyzes program instructions of untrusted code to identify software characteristics of the code. Software characteristics generally define one or more features, or characteristics, of a set of one or more instructions. Software characteristics may apply, for example, to an entire application, a function or group of functions, or a single instruction. Example software characteristics include frequently executed instructions, or "hot" code, such as loops; infrequently executed instructions, or "cold" code; sets of instructions with high register pressure, such as instruction sets that use many live values; and highly communicative instructions, such as instructions that are subject to and/or cause frequent communications between processes and/or process threads, e.g., instructions associated with portions of the software that, during multi-threaded execution, are subject to frequent communication between threads. Other characteristics may also be used and, in some implementations, multiple characteristics can apply to the same set of program instructions.

Multiple techniques, alone or in combination, may be used to determine the software characteristics of untrusted code. In some implementations, a developer of an untrusted application may provide characteristics within the code itself, e.g., using particular instructions that can be read by the program analyzer 106, e.g., included in code annotations or in code comments. In some implementations, the software can be provided to a translator that translates the software and heuristically determines software characteristics of the software during translation. For example, a software program may be provided to a compiler and, as the software is compiled, characteristics of the software may be determined based on known features and expected behavior. A compiler may be able to determine, for example, whether a set of instructions includes a loop that will be executed often, indicating that the set of instructions has a "frequently executed" characteristic.

In some implementations, software characteristics may be heuristically determined during execution of the software. For example, the program analyzer 106 may use dynamic compilation and profile guided optimization techniques to identify the software characteristics. Combinations of the foregoing methods, and/or additional methods, including different types of compilers (e.g., ahead-of-time compilers or just-in-time compilers) may be used to identify software characteristics.

In some implementations, zones may be selected for the software based on the software characteristics. A zone is a logical delimiter between sections of software instructions. Each zone may use sandboxing methods unique to that zone and different from other zones. Thus, a software zone may delimit, for example, a set of instructions of the software for the use of different sandbox methods. Example software zones include an entire program, shared objects, dynamically loaded libraries or modules, functions (e.g., as specified in the program, or post-lining), traces (e.g., singly entry, single exit control flow), regions/superblocks (e.g., single entry, multiple exits), and basic blocks (e.g., single entry, single exit, as specified in the program, or obtained post-optimization).

Zones are not mutually exclusive. Instructions may be in one or multiple zones, and zones may overlap or include other zones. For example, a program with two functions may have three zones: one for each function, and one for the entire program. In some implementations, each zone has its own set of software characteristics, e.g., based on the instructions included in each zone. In the above example, one function may have high register pressure, while the other function may be highly communicative; the entire program may have one, none, or both of those characteristics, plus any additional software characteristics that might apply to the program as a whole.

In some implementations, the delimiters for selecting software zones are determined in advance, e.g., by a developer of sandbox implementer. For example, it may be predetermined that each function of an application will be a separate zone. As another example, the sandbox implementer may include pre-programmed deterministic logic for determining how software zones are selected—e.g., for short programs, delimiters could be more specific and include fewer instructions, while longer programs may be more broad, using more instructions per software zone. In some implementations, sets of instructions having a particular software characteristic or combination of software characteristics may also be used to determine if that set of instructions should be within its own zone. For example, it may be predetermined that a set of instructions with high register pressure will have a software zone chosen for those instructions. In some implementations, a user of the sandbox implementer may choose the zone delimiters. In some implementations, zone delimiters may be machine-learned, e.g., the sandbox implementer may choose relatively high performing zone delimiters based on comparisons of the monitored performance of code with executed using various sandbox methods and software zones.

The sandbox data 108 component of the sandbox implementer 104 specifies sandbox methods that are eligible to be used for various software characteristics and, in some implementations, for various hardware components. For example, a program, such as a compiler or database engine, may have been characterized (e.g., by the program analyzer 106) as having a large instruction cache footprint, and the sandbox data 108 may specify that a sandboxing method that uses segmentation is appropriate for programs having a large instruction cache footprint. In implementations where hardware components are taken into consideration for sandboxing, the sandbox data specifies which sandbox methods are eligible to be used for various combinations of hardware components and software characteristics. For example, on computer devices using an x86-32 Intel Atom data processor, the sandbox data 108 may specify that zero-based sandboxing may be preferred over segmentation for sets of instructions that have a large instruction cache footprint, while segmentation may be preferred for the same software program on a non-Atom x86-32 data processor. As another example, for computer devices using an x86-64 data processor, the sandbox data 108 may specify that zero-based sandboxing is preferred, e.g., due to the application programming interface of the data processor's operating system.

The eligibility of the sandbox methods for various hardware and software characteristics may be determined in a number of ways. In some implementations, developers or other individuals may determine, e.g., based on empirical evidence and observed heuristics, which sandbox methods work best for which characteristics. Developers can specify which sandbox methods are to be used for which combinations of hardware and software characteristics. In some implementations, machine learning may be used to determine which sandbox methods will be specified for which hardware and software characteristics. For example, the performance of various sandbox methods may be monitored to determine which sandbox methods should be used.

The sandbox selector 110 component of the sandbox implementer 104 selects one or more sandbox methods for a software program from the sandbox methods specified by the sandbox data 108. For example, if a set of instructions included in the software program has a characteristic of "high register pressure," and the sandbox data 108 specifies post-update sandboxing, e.g., where a register is forced into a safe range after each modification, as an eligible sandboxing method, the sandbox selector may select post-update sandboxing as the sandboxing method for that set of instructions.

In implementations where a hardware profile is used to select sandbox methods, the sandbox selector 110 may access sandbox data 108 for a particular hardware profile. The pool of sandbox methods from which the sandbox selector 110 chooses may depend on the hardware profile. For example, the set of sandbox methods eligible to be used for hardware operating on an x86-64 type of data processor may be different from the set of sandbox methods eligible to be used for hardware operating on an x86-32 type of data processor. Hardware profiles may exist for many different types of hardware configurations, including, for example, processor type(s), e.g., x86-32, x86-64, ARM, ARM big.LITTLE, MIPS; and memory type/size/speed, e.g., DRAM, SRAM and various memory latency, clock speed, and transfer rate values. In some implementations, hardware profiles may also specify operating system software, and the pool of sandbox methods from which the sandbox selector 110 chooses may depend on the combination of hardware and software to be used. For example, the set of sandbox methods eligible to be used on an x86-32 bit processor running a Linux operating system may be different from the set of sandbox methods eligible to be used on an x86-32 bit processor running a Windows operating system.

In some implementations, e.g., where a hardware profile specifies multiple processor types, each type of data processor may have a different set of hardware specific sandbox methods eligible for selection. The sandbox selector 110 may choose the sandbox method(s) based on the type of data processor that is used for executing a particular instruction. For example, a heterogeneous data processor, such as an ARM big.LITTLE processor, can include multiple types of processor cores and registers, such as a combination of cores that execute the same instruction sets and have the same number of architectural registers. Each core type may be responsible for executing particular instructions, and a set of instructions executed by a slower core may use a different sandboxing method than a set of instructions that will be executed on a faster core. As another example, some heterogeneous data processors may execute different instruction sets and have a different number of architectural registers. Each core type may be responsible for executing particular instructions, and a slower core with less registers available for executing one instruction set may use a different sandboxing method than a faster core with more registers available for executing another instruction set.

In implementations where multiple zones are identified for a program, the sandbox selector 110 may select sandbox methods for each of the software zones. In some implementations, zone transfer rules may be determined for transferring control flow from one zone of the software to another during execution. Zone transfer rules may be determined based on software characteristics and/or sandbox methods of the zones involved in the transfer, and selected in a manner similar to that by which sandbox methods are selected. For example, developers or other individuals may use empirical evidence and observed heuristics to determine, for a transfer from a zone with one feature to a zone with another feature, which zone transfer rule(s) should be used. By way of example, a transfer between zones that communicate often may use shared memory for sandboxing, and a transfer between these zones may benefit from a zone transfer rule that checks and updates the shared memory at each zone transfer. In some implementations, machine learning may be used to determine which zone transfer rules will be selected for which transfers between zones with various characteristics. For example, the performance of executing software using different combinations of zone transfer rules, sandbox methods, and software characteristics may be monitored to determine which zone transfer rules should be used in various situations.

Zone transfer rules are designed to maintain control flow integrity and/or data integrity during transfers between software zones. Zone transfer rules can be enforced during execution using several techniques. Example techniques for enforcing zone transfer rules include: observing contracts at the entrance and/or exit of a zone, such as resetting or re-sandboxing certain registers; storing information in a trusted location and checking and updating the information at each zone transfer; trampoline code that must be executed when transferring from one zone to another; and indirect branch tables that specify safe locations to jump to. In some implementations, enforcement of zone transfer rules may be assisted by hardware. For example, indirect branch tables can be accelerated with a hardware branch target buffer. Zone transfer rules may be used for none, some, or all zone transfers.

In some implementations, as in the example sandbox implementer 104, a validator 112 component may also be used to facilitate the selection of sandbox methods, for example, by ensuring that various sandboxing rules and zone transfer rules are properly observed, and by ensuring that control flow integrity and data integrity are maintained for a set of selected sandboxing methods. The validator 112 component may include separate instructions for determining whether a transfer from one zone of the software to another is safe, e.g., by proving control flow integrity and data integrity. In some implementations, the method in which control flow is sandboxed can be different from the method in which data is sandboxed, e.g., one sandbox method or zone transfer rule chosen for a set of instructions may maintain control flow integrity while another sandbox method or zone transfer rule for the same set of instructions is designed to maintain data integrity.

While the example sandbox implementer 104 is depicted as including four separate components, e.g., the program analyzer 106, sandbox data 108, sandbox selector 110, and validator 112, other configurations may be used for a sandbox implementer 104. The depicted components may be logically separate components, e.g., no physical separation between components within the sandbox implementer. In addition, other or different components may be included, such as a hardware analyzer for determining a hardware profile for a computer device. As another example, multiple validators may be used or included in the validator component 112, the validator 112 component may be excluded from the sandbox implementer 104, or it may be part of the sandbox selector 110 component. In general, the sandbox implementer 104 may perform any or all of the functions described as being performed by each of the components. In some implementations, the sandbox implementer, and/or the components of the sandbox implementer, may be implemented by separate data processing apparatus and/or systems. For example, a distributed processing system may use two data processors for program analysis, another data processor for the sandbox selection process, and yet another data processor to implement the validator 112.

Figure 2:
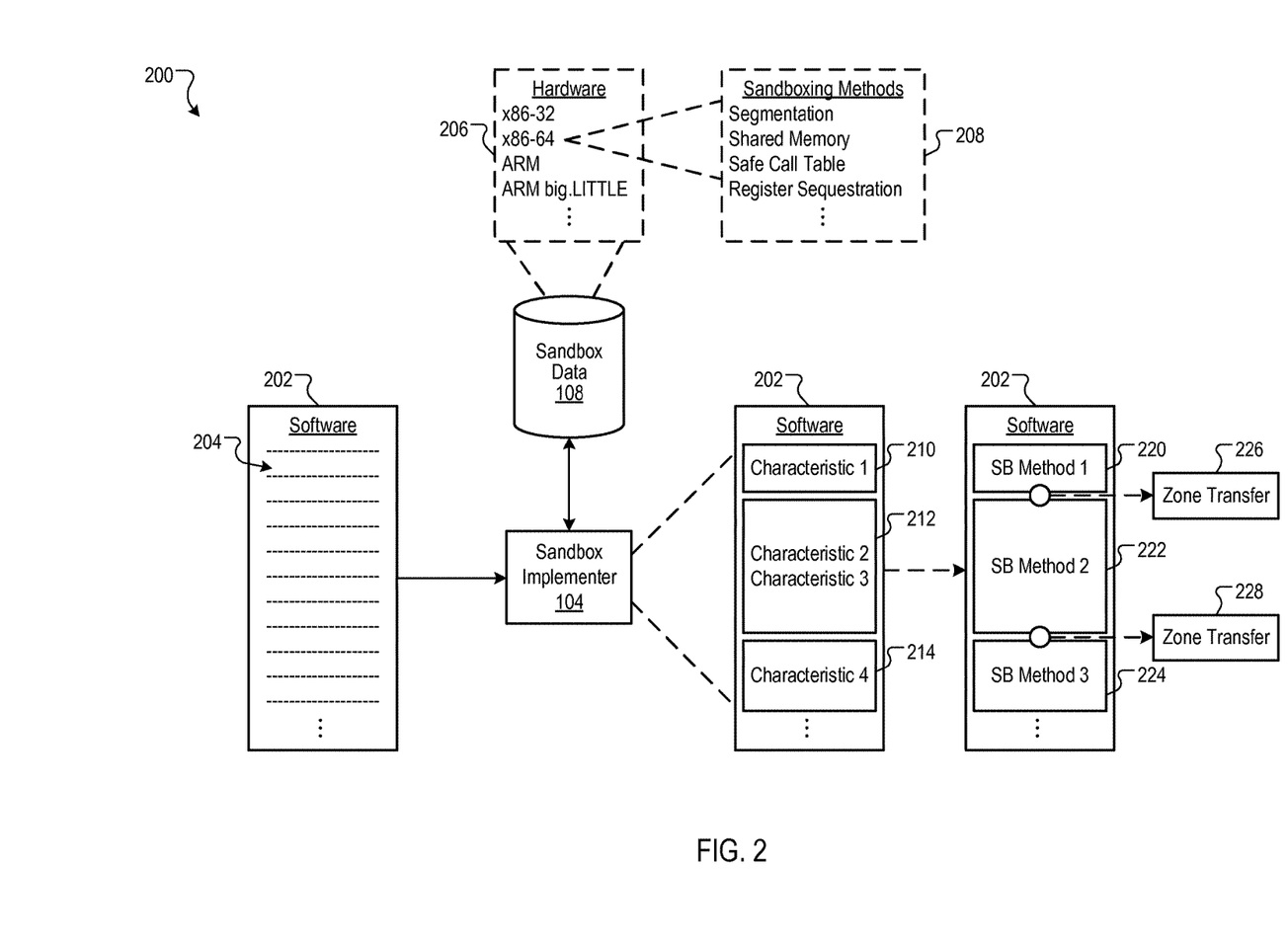
FIG. 2 is an illustration of an example data flow for dynamically sandboxing software.

FIG. 2 is an illustration of an example data flow 200 for dynamically sandboxing software. In the example data flow 200, software 202 that includes program instructions 204 is provided to the sandbox implementer 104 for dynamic sandboxing. The sandbox implementer 104 may, for example, be included in web browser software installed on a computer device, and the software 202 may be, for example, an untrusted program that the web browser has been instructed to execute (e.g., a program provided by a web page).

The sandbox implementer 104 identifies, from a set of predefined software characteristics, software characteristics of the program instructions 204 included in the software 202. In the example data flow 200, the sandbox implementer 104 has identified four different characteristics for three different sets of program instructions, e.g., characteristic 1 for a first instruction set 210, characteristics 2 and 3 for a second instruction set 212, and characteristic 4 for a third instruction set 214. As described above, the characteristics may be heuristically determined by a user, determined by a compiler/translator during translation, or determined during execution using a compiler and/or profile guided optimization techniques.

After identifying the software characteristics, the sandbox implementer 104 accesses the sandbox data 108 to identify which sandbox methods are eligible for sandboxing software 202 having the identified characteristics. In the example data flow 200, the sandbox implementer has also identified a hardware profile for the computer device, and the hardware profile can also be used to determine which sandbox methods are eligible for sandboxing the software 202. A hardware list 208 included in the sandbox data 108 specifies hardware profiles and, in the example data flow 200, lists types of data processors. Having determined, in the example data flow 200, that a computer device matches the hardware profile of an x86-64 data processor, the sandboxing methods 208 that correspond to that particular hardware profile are eligible for selection by the sandbox implementer 104. The example sandboxing methods 208 shown for an x86-64 data processor include segmentation, shared memory, safe call table, and register sequestration. Other sandboxing methods may be used for x86-64 type data processors, and, in some implementations, hardware profiles for different types of x86-64 processors and/or different types of operating system software may have their own corresponding sandboxing methods.

In some implementations, the sandboxing methods 208 specified by the sandbox data 108 have associated characteristics. For example, the "shared memory" sandboxing method may be associated with the "highly communicative" software characteristic, indicating that a shared memory method of sandboxing is eligible for use for sets of program instructions that have the highly communicative characteristic. In some implementations, the sandbox data 108 includes a mapping of software characteristics to sandboxing methods. For example, after determining hardware type, the sandbox implementer may specify a software characteristic and be presented with sandboxing methods that are eligible to be used for that characteristic and on the particular hardware type.

Other data structures and configurations may be used to organize the sandbox data 108 in a manner that allows the sandbox implementer to determine which sandboxing methods are eligible for use. The sandbox data 108 may, for example, be hardcoded into the sandbox implementer 104, stored in a database accessible by the sandbox implementer 104, or accessible over a networked server computer that manages the sandbox data 108. Any combination of the above configurations may also be used; e.g., the sandbox implementer may have hardcoded instructions for determining hardware profiles, and send a request including the hardware profile to a server computer that returns a mapping of software characteristics to eligible sandbox methods in response to the request.

The sandbox implementer 104 uses the eligible sandbox methods to determine which sandbox method(s) will be used to execute the program instructions. Sandbox methods may be chosen, for example, based on eligibility, predicted performance, and/or compatibility. For example, every eligible sandbox method may be used for a set of instructions, or if only one sandbox method is eligible, the single sandbox method may be chosen. In situations where the sandbox implementer has identified zones for the software, transferring control between zones, and sandboxing methods, may present compatibility issues, resulting in limited choices for sandboxing methods. Predicted performance, e.g., a predicted speed or overhead for a sandbox method, may also be used to choose a sandboxing method.

In implementations where zones have been identified for software, sandboxing methods may be chosen separately for each zone. In the example data flow 200, zones have been identified for the program instructions. A first zone 220 is associated with the first instruction set 210, and a sandbox method, SB Method 1, is selected for the first zone 220 based on the characteristic identified for the instructions included in the zone, e.g., Characteristic 1. A second zone 222 is associated with the second instruction set 212, and a sandbox method, SB Method 2, is selected for the second zone 222 based on the characteristics identified for the instructions included in the zone, e.g., Characteristics 2 and 3. A third zone 224 is associated with the third instruction set 214, and a sandbox method, SB Method 3, is selected for the third zone 224 based on the characteristic identified for the instructions included in the zone, e.g., Characteristic 4. In the example data flow 200, the three software zones (220, 222, and 224) correspond to the three sets of instructions (210, 212, 214). In some implementations, the software zone delimiters may not correspond directly with the instruction sets. For example, one software zone could encompass both the first and second set of instructions (e.g., 210 and 212), and, as described above, one software zone could encompass the entire software 202.

In the example data flow 200, the sandbox implementer 104 has determined zone transfer safety rules for two zone transfers. For example, the first zone transfer 226 is between the first zone 220 and the second zone 222, while the second zone transfer is between the second zone 222 and the third zone 224. Depending on the control flow of the software 202 during execution, there may also be a zone transfer between the first zone 220 and the third zone 224. In some implementations, zone transfers rules are determined unidirectionally, e.g., a transfer from the first zone 220 to the second zone 222 may have a different zone transfer rule (or rules) than a transfer from the second zone 222 to the first zone 220. By way of example, a particular function included in software may be called multiple times from different parts of the code. Zone transfer rules for transferring control flow to the function may depend on the characteristics of the set of instructions from which the function call originated. In some implementations, zone transfer rules are determined bidirectionally, e.g., a transfer from one zone to another uses the same zone transfer rule or rules as a transfer in the opposite direction. As described above, the particular zone transfer rules used may depend on the software characteristics and/or the sandboxing methods to be used.

After selecting the appropriate sandboxing methods and, if applicable, zone transfer safety rules, the sandbox implementer 104 causes execution of the software 202 using the selected sandboxing methods. In some implementations, the execution of the software 202 may be monitored, e.g., by a user, the sandbox implementer, or another system, to identify potential problems with the software 202. Many problems can be detected, such as attempts to access and/or modify unauthorized resources, attempts to insert a virus or other malicious code into computer device resources, and wasting of computer device resources. In some implementations, potential problems can result in alerts or notifications being provided, e.g., to a user or another system, and results can be logged.

In addition to the sandboxing methods, software characteristics, and heuristics described in the foregoing examples, many other sandboxing methods, software characteristics, and heuristics for determining characteristics may be used by a sandbox implementer to dynamically sandbox software. Sandboxing methods include, for example, using segmentation; using a "safe" base pointer (e.g., known to be safe for a current sandboxing methodology) to which a bounded register or immediate offset is added; using pre-load/store/branch sandboxing, where each load/store/branch is forced into a safe range before executing; using post-update sandboxing, where a register is forced into a safe range after each modification; using shared memory or double-memory mapping for safe and fast communication between multiple parts of the same or different code base; registers may be sequestered for different purposes, such as a thread pointer, pointer to a particular data structure, or special device registers; indirect branch destinations may be aligned to a particular bundle size; a safe stack can be used for call/return sequences, where the stack is known to only contain valid function addresses; a safe call table can be used for control flow transfer, where all entries in the table are known to be good destinations; and safe trampoline code can be used for control flow transfer. Where things are "known" to be good or safe in the previous examples, they may be known to be good or safe under the particular sandboxing methodologies, e.g., things known to be safe in one zone under one sandboxing methodology may be different from the things known to be safe in another zone under another sandboxing methodology.

Heuristics used to identify software characteristics and to determine which sandbox methods should be used include, for example, using compilers to identify loops or other code that is often executed; measuring register pressure by monitoring live variable ranges, e.g., on a per-function basis; profile guided optimization techniques—e.g., where code is compiled once with profiling code, run with representative workloads, and recompiled using that information—may be used to determine many characteristics; a profiler and/or interpreter can be used at runtime to measure which parts of the code are executed often; a just-in-time compiler can dynamically compile and recompile the code as needed for continued monitoring; pieces of code that communicate often may be identified based on the instructions; control flow complexity may be measured, which can influence how control flow transfer is performed; the average number of instructions per basic block could dictate the size of bundles; instructions that interact directly with devices can be identified; code that is not executed often may also be identified.

The heuristics may be used to determine sandbox methods in many ways, for example, if the software is known, by profile guidance, post-compilation measurements, or other insight, to have a large instruction cache footprint, using segmentation where available may produce smaller code; if instructions are known to do a lot of accesses to memory through one or multiple pointers, a single safety-setting step for each based pointer may result in smaller code and fewer sandboxing instructions; instruction sets that have high register pressure may perform better if the sandbox technique reserves as few registers as possible; instructions that use message passing, such as MPI, can be compiled to other primitives, e.g., using shared memory or double-memory-mapping; for software with multiple zones with different characteristics, different registers may be sequestered for different purposes and for different sandboxing techniques and/or zone transfer rules; for instruction sets that perform a lot of call/returns, such as a heavily object-oriented code or functional language application, using a safe stack for call/return sequences may reduce overhead of call/returns and improve the use of hardware related prediction methods; instruction sets that perform relatively little indirect control flow transfers but do a lot of data accesses and may have large numbers of instructions per basic block, such as database and numerical applications, a safe call table for control flow transfer and/or safe trampoline code may be used.

Figure 3:
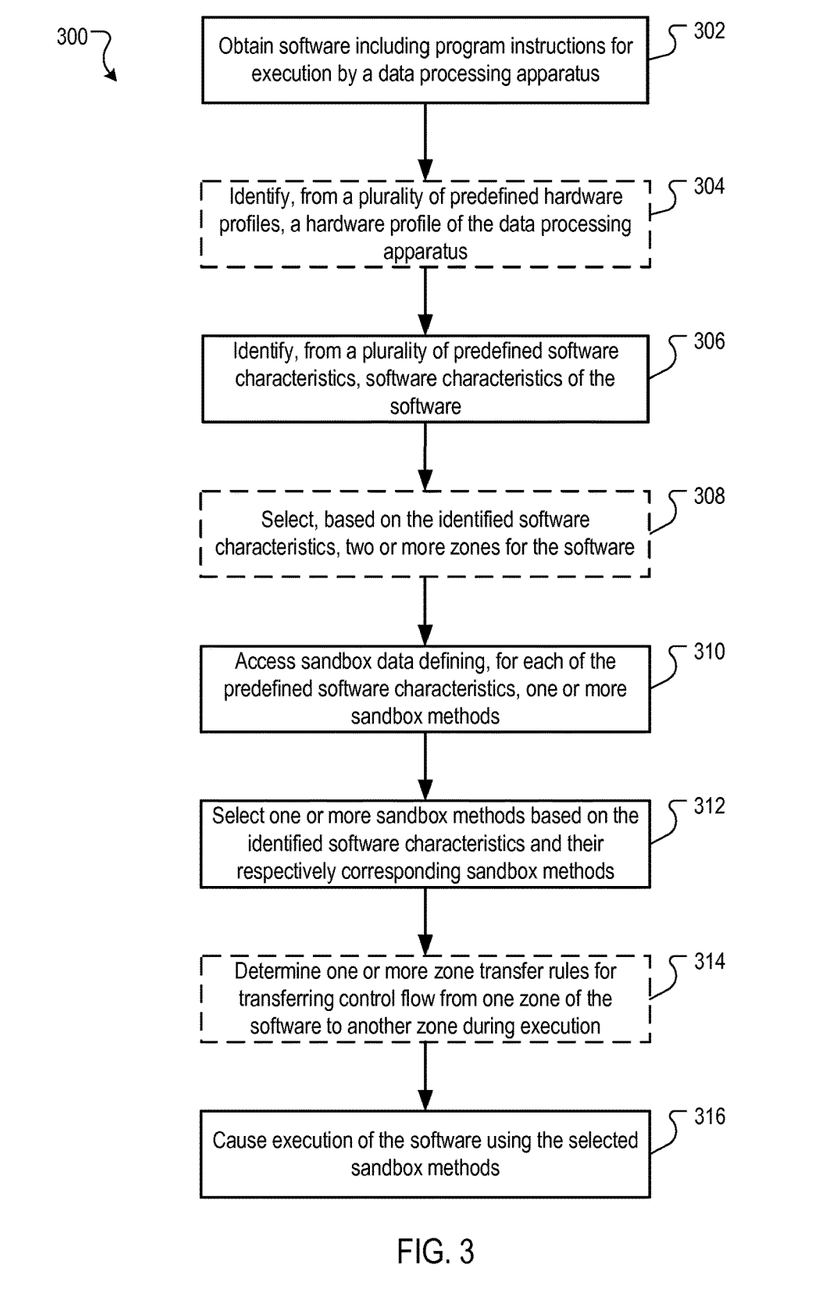
FIG. 3 is a flow diagram of an example process in which software is dynamically sandboxed.

FIG. 3 is a flow diagram of an example process 300 in which software is dynamically sandboxed. The process 300 may be performed by data processing apparatus, such as a data processing apparatus included in a computer device. The order in which the steps of the example process 300 are presented is an example order; additional steps may be performed, and some steps of the process 300 may be performed in a different order, or not at all.

Software including program instructions for execution by a data processing apparatus are obtained (302). The software may be, for example, a code, script, or application to be executed by the data processing apparatus included in a cell phone, tablet, personal computer, or server computer.

In some implementations, a hardware profile of the data processing apparatus is identified from a plurality of predefined hardware profiles (304). Each identified hardware profile corresponds to a set of hardware specific sandbox methods. For example, some sandbox methods may not work as well, or at all, on a particular type of data processing apparatus or operating system, and the sandbox methods that correspond to a particular hardware profile may be a set of sandbox methods designed to be used on the particular data processing apparatus.

Software characteristics of the software are identified from a plurality of predefined software characteristics (306). Each identified software characteristic corresponds to a set of the program instructions included in the software. In some implementations, the software characteristics are identified by providing the software to a translator that translates the software and heuristically determines software characteristics of the software during translation. For example, a compiler may be able to make an educated guess as to whether a particular set of instructions may be executed often, such as a loop. This can result in the set of instructions that include the loop having the characteristic, "frequently executing."

In some implementations, the software characteristics are identified by causing execution of the software and heuristically determining software characteristics of the software during execution. For example, profile guided optimization techniques can be used while executing the software to monitor and identify actions performed by the software. In some implementations, a user may observe the software during execution or compilation and identify characteristics of the software. Developers may, in some implementations, provide identifiers within the software that specify characteristics of the software. Any of the aforementioned methods, alone or in combination, may be used to identify software characteristics of the software.

In some implementations, two or more zones are selected for the software based on the identified software characteristics (308). Zones may be selected based on the software characteristics of the sets of instructions, e.g., when control flow changes from a set of instructions with one characteristic to a set of instructions with another characteristic, each set may be placed into a separate software zone. Many methods may be used to determine software zones, which may encompass the entire software, overlap with other zones, and/or include one or more other zones. Zone delimiters may be, for example, shared objects, functions, traces, regions, and basic blocks, to name a few. In some implementations, a new zone may be chosen when a different sandboxing method is to be used for a set of instructions. For example, if a first function, with a first characteristic, calls a second function, with a second characteristic, the functions may be placed in separate zones if the two characteristics correspond with two different sandboxing methods.

Sandbox data defining, for each of the predefined software characteristics, one or more sandbox methods, is accessed (310). The sandbox methods are eligible for use when executing program instructions that correspond to the predefined software characteristics. For example, the sandbox data may include a mapping of software characteristics to eligible sandboxing methods. In implementations where hardware profiles are used to determine sandbox methods, the sandbox data may include a mapping of hardware profiles to software characteristics, and from software characteristics to sandboxing methods.

One or more sandbox methods are selected, from a plurality of sandbox methods defined by the sandbox data, based on the identified software characteristics and their respectively corresponding sandbox methods (312). Each of the plurality of sandbox methods comprises sandbox instructions for executing program instructions using fault isolation techniques. In implementations where zones have been selected for the software, sandbox methods may be separately selected for each zone. In implementations where a hardware profile is identified for the data processing apparatus, the sandbox methods eligible for selection may consist of a set of hardware specific sandbox methods that correspond to the identified hardware profile.

In some implementations, an identified hardware profile specifies two or more different types of data processors for the data processing apparatus. For example, an ARM big- .LITTLE data processor includes two different processor cores, and each core may be assigned to execute different program instructions. In these situations, each different type of data processor specified by the hardware profile has a different set of hardware specific sandbox methods, and the set of sandbox methods from which sandbox methods are selected depends upon which type of data processor is to be used for execution of the program instructions that correspond to the identified software characteristics that form a basis for selecting sandbox methods. For example the sandbox data may indicate that the sandbox methods eligible to be selected for program instructions processed by the "big" processor core of an ARM big.LITTLE data processor may be different from the sandbox methods eligible to be selected for program instructions processed by the "little" processor core of the ARM big.LITTLE processor.

In some implementations, one or more zone transfer rules are determined for transferring control flow from one zone of the software to another zone during execution (314). As described above, zone transfer rules may depend on software characteristics identified and/or sandbox methods selected for a particular piece of software. The zone transfer rules are generally used to maintain control flow integrity and data integrity during execution of the sandboxed code.

The process (300) causes execution of the software using the selected sandbox methods (316). In implementations where zone transfer safety rules are determined, the execution of the software is performed using the determined zone transfer rules. Executing software using sandboxing methods facilitates, for example, the safe identification of errors, unauthorized activity, viruses, and other potential issues with software. The dynamic aspects of sandbox method selection are designed to reduce overhead, such as processing time and system resource usage, associated with sandboxing methods that are performed without taking software characteristics of untrusted code into consideration.

Figure 4:
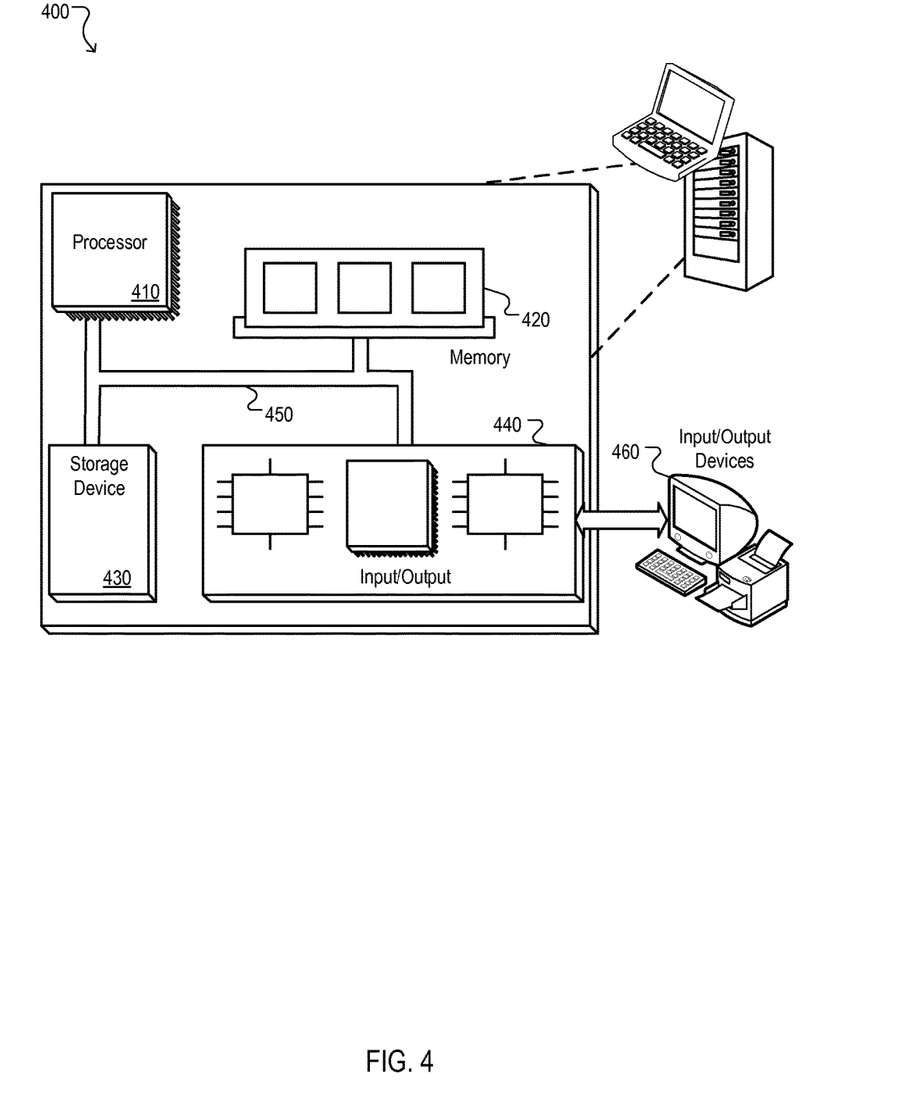
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's computer device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a computer device (e.g., for purposes of displaying data to and receiving user input from a user interacting with the computer device). Data generated at the computer device (e.g., a result of the user interaction) can be received from the computer device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   obtaining a software program that includes a set of program instructions for execution by the data processing apparatus;
   identifying different sections of program instructions from the set of program instructions of the software program, each of the different sections of program instructions corresponding to a different portion of the software program;
   selecting, for each of the different sections of program instructions and from among a plurality of sandbox methods that are available to the data processing apparatus, a respective sandbox method to apply during execution of the section of program instructions, wherein each of the plurality of sandbox methods comprises respective sandbox instructions for executing program instructions using fault isolation techniques that are different from fault isolation techniques of each other sandbox method of the plurality of sandbox methods, wherein the respective sandbox methods selected for at least some of the different sections of program instructions are different from each other; and causing execution of the software program using the respective sandbox methods selected for each of the different sections of program instructions.

2. The method of claim 1, wherein each section of program instructions among the different sections of program instructions represents a respective zone of the software program.

3. The method of claim 2, further comprising:
determining one or more zone transfer rules for transferring control flow from one zone of the software program to another zone of the software program during execution of the software program,
wherein causing execution of the software program comprises causing execution of the software program using the determined zone transfer rules.

4. The method of claim 1, wherein the different sections of program instructions are non-overlapping.

5. The method of claim 1, wherein two or more of the different sections of program instructions include overlapping programming instructions that are common to each of the two or more different sections of program instructions.

6. The method of claim 1, comprising identifying the different sections of program instructions based on identifying different software characteristics of the different sections of program instructions.

7. The method of claim 6, wherein identifying the different software characteristics of the different sections of program instructions comprises heuristically determining that the different sections of program instructions have the different software characteristics.

8. The method of claim 7, wherein heuristically determining that the different sections of program instructions have the different software characteristics comprises providing the software program to a translator that translates the software and heuristically determines the software characteristics of the different sections of program instructions during translation.

9. The method of claim 7, wherein heuristically determining that the different sections of program instructions have the different software characteristics comprises:
causing execution of the software program; and
heuristically determining the software characteristics of the different sections of program instructions during execution.

10. The method of claim 6, wherein identifying the different software characteristics of the different sections of program instructions comprises identifying code annotations or comments that specify the different software characteristics.

11. The method of claim 1, wherein the different sections of program instructions correspond to at least one of an entire program, a shared object, or a dynamically loaded library.

12. A system comprising:
a data processing apparatus; and
a data storage device storing instructions that, when executed by the data processing apparatus, perform operations comprising:
obtaining a software program that includes a set of program instructions;
identifying different sections of program instructions from the set of program instructions of the software program, each of the different sections of program instructions corresponding to a different portion of the software program;
selecting, for each of the different sections of program instructions and from among a plurality of sandbox methods that are available, a respective sandbox method to apply during execution of the section of program instructions,
wherein each of the plurality of sandbox methods comprises respective sandbox instructions for executing program instructions using fault isolation techniques that are different from fault isolation techniques of each other sandbox method of the plurality of sandbox methods,
wherein the respective sandbox methods selected for at least some of the different sections of program instructions are different from each other; and
causing execution of the software program using the respective sandbox methods selected for each of the different sections of program instructions.

13. The system of claim 12, wherein each section of program instructions among the different sections of program instructions represents a respective zone of the software program.

14. The system of claim 13, wherein the operations comprise:
determining one or more zone transfer rules for transferring control flow from one zone of the software program to another zone of the software program during execution of the software program,
wherein causing execution of the software program comprises causing execution of the software program using the determined zone transfer rules.

15. The system of claim 12, wherein the different sections of program instructions are non-overlapping.

16. The system of claim 12, wherein two or more of the different sections of program instructions include overlapping programming instructions that are common to each of the two or more different sections of program instructions.

17. The system of claim 12, wherein the operations comprise identifying the different sections of program instructions based on identifying different software characteristics of the different sections of program instructions.

18. The system of claim 17, wherein identifying the different software characteristics of the different sections of program instructions comprises heuristically determining that the different sections of program instructions have the different software characteristics.

19. The system of claim 18, wherein heuristically determining that the different sections of program instructions have the different software characteristics comprises providing the software program to a translator that translates the software and heuristically determines the software characteristics of the different sections of program instructions during translation.

20. The system of claim 18, wherein heuristically determining that the different sections of program instructions have the different software characteristics comprises:
causing execution of the software program; and
heuristically determining the software characteristics of the different sections of program instructions during execution.

21. A non-transitory computer readable medium comprising instructions that, when executed by data processing apparatus, cause the data processing apparatus to perform operations comprising:
- obtaining a software program that includes a set of program instructions;
- identifying different sections of program instructions from the set of program instructions of the software program, each of the different sections of program instructions corresponding to a different portion of the software program;
- selecting, for each of the different sections of program instructions and from among a plurality of sandbox methods that are available, a respective sandbox method to apply during execution of the section of program instructions,
  - wherein each of the plurality of sandbox methods comprises respective sandbox instructions for executing program instructions using fault isolation techniques that are different from fault isolation techniques of each other sandbox method of the plurality of sandbox methods,
  - wherein the respective sandbox methods selected for at least some of the different sections of program instructions are different from each other; and
- causing execution of the software program using the respective sandbox methods selected for each of the different sections of program instructions.

* * * * *